United States Patent

Almond

[15] 3,670,393
[45] June 20, 1972

[54] METHOD OF FORMING HONEYCOMB PANEL

[72] Inventor: Elmer C. Almond, Lansdale, Pa.
[73] Assignee: The Budd Company, Philadelphia, Pa.
[22] Filed: April 9, 1970
[21] Appl. No.: 26,921

[52] U.S. Cl. ............................29/423, 29/428, 29/DIG. 1, 29/DIG. 3, 29/DIG. 9, 29/455 LM, 72/54
[51] Int. Cl. ............................................B23p 17/00
[58] Field of Search..............29/423, 428, 421, 432, DIG. 1, 29/DIG. 3, DIG. 9, 420, 455 LM; 72/54, 57, 60

[56] References Cited

UNITED STATES PATENTS

| | | | |
|---|---|---|---|
| 2,857,657 | 10/1958 | Wheeler | 29/DIG. 3 |
| 2,988,809 | 6/1961 | Hall | 29/423 |
| 3,060,561 | 10/1962 | Watter | 29/423 |
| 3,128,544 | 4/1964 | Allingham | 29/DIG. 1 |
| 3,460,233 | 8/1969 | Pfaffenberger | 29/423 |

Primary Examiner—John F. Campbell
Assistant Examiner—Donald P. Rooney
Attorney—Thomas I. Davenport, Edward M. Farrell, John D. Sowell, Alford L. Trueax, Jr. and William R. Nolte

[57] ABSTRACT

A method of forming honeycomb panels of high strength material whereby the panel to be formed is positioned between an inner metallic cover sheet and an outer sheet of resilient material. The sandwich pack so formed is disposed between die set members which are moved relative to each other to deform the pack. During the forming operation, the edge portions of individual honeycomb cores bite into the bonding surface of the resilient cover sheet material which functions as a structural restraint to minimize dimensional failure by preventing the spreading apart of adjacent cores one from another on the tension side of the bend. All of the bending of the panel is taken in uniform deformation on the compression side of the panel.

3 Claims, 2 Drawing Figures

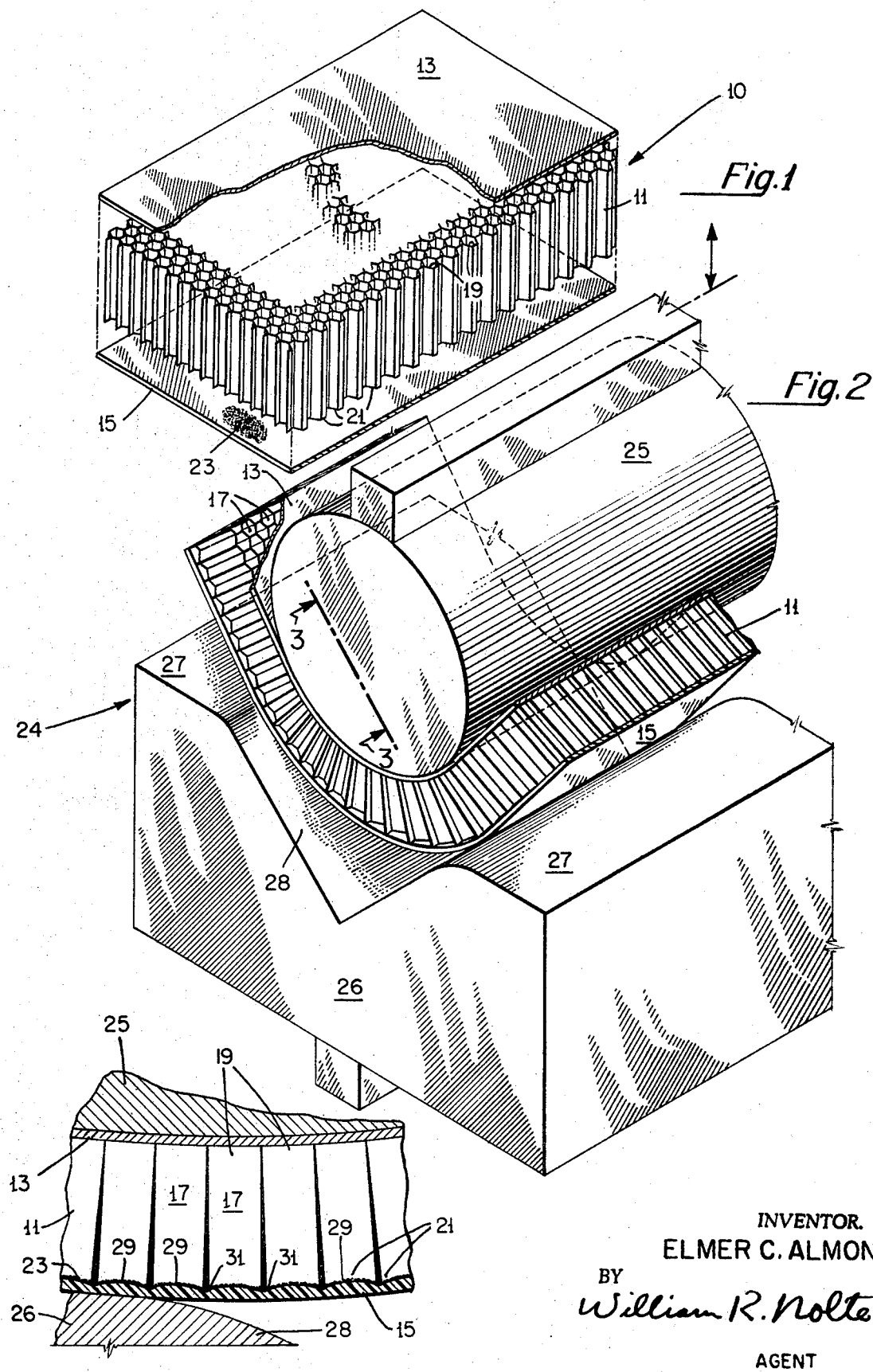

METHOD OF FORMING HONEYCOMB PANEL

The present invention relates to a method for deforming high strength planar metallic honeycomb core members into compound curve form by the application of pressure between opposed die-set members. More particularly, the present invention relates to a method for deforming panel honeycomb members in compound curve form by the application of pressure between opposed die-set members wherein the application of a resilient bonding sheet to an outer surface of core panel permits deforming without destroying the honeycomb core member or introducing deleterious stress patterns therein.

The invention will be more readily understood by reference to the accompanying specification and drawing wherein:

FIG. 1 is an exploded view of a planar honeycomb pack wherein a high strength honeycomb core panel is sandwiched between a metallic plate on the top and a resilient member beneath;

FIG. 2 is a three-quarter elevational view partially in section and showing the sandwich arrangement of FIG. 1 disposed between movable die members to deform the pack;

FIG. 3 is a sectional view taken along the lines 3—3 of FIG. 2 illustrating the relationship between the outer resilient sandwich cover sheet and edge portions of adjacent cores of the honeycomb panel.

Honeycomb metal core panels having high strength and which are highly resistant to deformation may be deformed in accordance with the present invention by a procedure wherein crushing and deforming stresses in the deformed panel are confined to one side of the panel. The invention method involves the application, of a resilient cover sandwich sheet to the outer edge portions of the cores adjacent to the tension surface of the honeycomb panel whereby separation between adjacent cores of the panel on the tension side of the bend is prevented and all of the deformation is uniformly confined to the compression side of the panel.

With reference now to FIG. 1 of the drawings there is shown in exploded relation a sandwich arrangement 10 including a central honeycomb panel 11, a top cover member 13, and a lower resilient sheet of material 15. The honeycomb panel 11 shown is illustrated as being of planar form and having characteristics of being highly resistant to bending or deformation. The panel 11 may be of conventional construction and in the present instance includes cells 17 formed of metal such as aluminum. While the cells are illustrated in the present instance as being hexagonal in form it is to be understood that the same may be of other patterns such as square, rectangular, cylindrical, and the like. The aforementioned top cover sheet rests upon the top edge portions 19 of the cells of the panel, while the lower edge portions 21 of the cells engage the lower resilient sheet 15. The latter sheet is adhered to the lower edges 21 by means of a suitable form of contact cement 23 carried on its upper face. The lower resilient cover sheet 15 may be of resilient plastic material such as a form of vinyl. In the arrangement shown the top edge portions 19 of the honeycomb panel 11 corresponds to its compression side, while the lower edge portions 21 of the cells correspond to its tension side when the same is deformed by die-set means 24 shown in FIG. 2. The resilient lower cover sheet 15 moreover has a tensile strength which exceeds the compressive forces adjacent the compressive side 12 of the panel 11 when the same is subjected to forming in the die-set means illustrated in FIG. 2. The die-set means 24 comprise a male die member 25 and a female die member 26 with a cavity 28. In the present instance the male die member is shown in cylindrical form but may be of a compound or reverse compound curve form while the female die 26 may be of a complemental construction to accept such compound curve form.

In the operation of the deforming process, after adhering the bottom cover sheet 15 to the lower side of the honeycomb panel 11 with the adhesive 23, the panel 11 with lower cover adhered thereto is placed across the top of the female die part 26 of the die-set means 23 to span the cavity 28 in its top surface. When so positioned, the lower cover sheet 15 contacts the upper flat surface 27 of the female die. The top cover member 13 is then placed on the top of the panel 11 whereupon the male member 25 is moved toward the female member 26 to deform the core panel 11 therebetween. During this action the top portion 12 of the honeycomb panel undergoes lateral forces tending to deform it in compression so that width of the cells 17 is less adjacent their top edge portions 17, than along their lower edge portions as at 24. The top marginal edges 19 of the cores or cells of the honeycomb are enabled to slide relative to the aluminum sheet 13 to deform by uniformly crushing slightly in compression. Due to the lower resilient cover sheet 15, the lower edge portions of the cells 17 are restrained against separation adjacent the edge portions 14 by virtue of the locking engagement of said edge portions with said resilient sheet 15.

Referring now to FIG. 3 it is seen that the lower edge portions 21 of the individual cells 17 bite into and indent the top surface of cover sheet 15 as indicated by the depressed portions as at 31. Inasmuch as the tension capability of the sheet 15 exceeds the force required to crush the top portions 19 of the cells 17 in compression, practically all of the deformation of the honeycomb panel occurs adjacent the top portion 19 of the panel and tension deformation adjacent the tension side 21 is thereby minimal. Upon the panel 11 being so formed the male and female die members 25 and 26 respectively are pulled apart to enable lifting off of the cover sheet 13, and upon removal of panel 11 and lower cover sheet 15 adhered thereto, the latter may be peeled off leaving the panel 11 of the desired form.

While the invention has been described in detail in the foregoing specification and the drawing similarly illustrates the same, it will be obvious to those skilled in the art that various changes and modifications may be made therein. By way of example it has been found that under certain circumstances the upper cover sheet 13 may be omitted from the above described steps. It is aimed therefore to cover all such changes and modifications as fall within the true spirit and scope of the invention.

What is claimed is:

1. The method of forming a honeycomb panel having a multiplicity of cells having edge portions defining a compression side and an opposite tension side, comprising the steps of, providing a sheet of plastic material having a tensile strength which exceeds the compressive forces required to laterally crush the cells of said panel adjacent its compressive side, adhering one surface of said sheet of plastic material to said tension side of said panel with a cement, providing a die-set having a male member and a female member with a cavity therein, placing said panel with said plastic sheet adhered thereto with the latter in contact with said female member and bridging said cavity, applying said male die to the compression side of said panel to force said panel into said cavity.

2. In the method as set forth in claim 1 including the step of providing said sheet of plastic material with a deformable surface to engage said edge portions defining its tension side, whereby upon applying said male die to said compression side of said panel to force said panel into said cavity, said edges of said cells adjacent said tension side of said panel are caused to penetrate said deformable surface to interlock therewith to thereby structurally restrain adjacent cells along said tension side against movement.

3. In the method as set forth in claim 1 and including the step of providing a sheet of metal, placing said sheet of metal on said compression side of said panel after adhering said sheet of plastic material to said tension side, whereby upon said panel being forced within the cavity of said female die by said male die, said edge portions adjacent said compression side are caused to slide relative to said sheet of metal thereby enabling said cells to uniformly fall adjacent said compression side of said panel.

* * * * *